United States Patent Office 3,769,286
Patented Oct. 30, 1973

3,769,286
TRIALKOXY QUINAZOLINES
Hans-Jurgen E. Hess, Old Lyme, Conn., assignor to
Pfizer Inc., New York, N.Y.
No Drawing. Original application May 21, 1970, Ser. No.
39,541, now Patent No. 3,669,968. Divided and this
application Apr. 3, 1972, Ser. No. 240,865
Int. Cl. C07d 51/48
U.S. Cl. 260—251 Q            5 Claims

ABSTRACT OF THE DISCLOSURE

A series of novel 2-substituted-4-amino-6,7,8-trialkoxy-quinazolines have been prepared, including their acid addition salts. These compounds are useful in therapy as potent antihypertensive agents. Methods for their preparation are described in detail, including various synthetic routes leading to the required novel intermediates.

---

This application is a division of application Ser. No. 39,541, filed May 21, 1970, now U.S. Pat. 3,669,968.

BACKGROUND OF THE INVENTION

This invention relates to various new and useful trialkoxy-quinazoline compounds, and to their chemical method of preparation. More particularly, it is concerned with a novel series of 2-substituted-4-amino-6,7,8-trialkoxy-quinazolines and their pharmaceutically acceptable acid addition salts, which are of especial value in medicine in view of their unique chemotherapeutic properties.

In the past, various attempts have been made in the field of organic medicinal chemistry to obtain new and useful antihypertensive agents. For instance, in copending U.S. patent application Ser. No. 690,101, filed Dec. 13, 1967, now U.S. Pat. 3,511,836, there are disclosed various 2,4-diamino-6,7 - dimethoxyquinazoline compounds useful for these purposes. However, in the search for still newer and better antihypertensive agents, other attempts have proven to be less successful, e.g., the 8-monomethoxy, 6,7-methylenedioxy and 6,7-ethylenedioxy derivatives in this series are all substantially inactive.

SUMMARY OF THE INVENTION

In accordance with the present invention, it has now been rather surprisingly found that various novel 6,7,8-trialkoxyquinazoline compounds are extremely useful as antihypertensive agents, despite the aforesaid teaching indicated above, particularly regarding the 8-monomethoxy derivatives. More specifically, the novel compounds of this invention are all 2-substituted-4-amino-6,7,8-trialkoxyquinazolines of the formula:

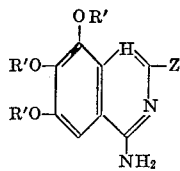

and the acid addition salts thereof, wherein R' is chosen from the group consisting of methyl and ethyl; and Z is a member selected from the group consisting of monoalkylamino and dialkylamino each having up to three carbon atoms in the alkyl moiety, mono($\beta$-hydroxyethyl) amino and di($\beta$-hydroxyethyl)amino, pyrrolidino, piperidino, homopiperidino and N-substituted piperazino of the formula:

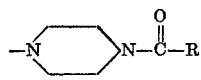

wherein R is chosen from the group consisting of alkoxy having from one to six carbon atoms, alkenyloxy having up to five carbon atoms and hydroxyalkoxy having from two to six carbon atoms, alkyl having from one to six carbon atoms, phenyl, naphthyl, furyl and thienyl. These novel compounds are all useful in reducing blood pressure of hypertensive subjects.

Of special interest in this connection are such typical and preferred member compounds of the invention as 2-(N-monomethylamino)-4-amino-6,7,8-trimethoxy-
quinazoline,
2-(N,N-dimethylamino)-4-amino-6,7,8-trimethoxy-
quinazoline,
2-[4-(2-furoyl)-1-piperazinyl]-4-amino-6,7,8-trime-
thoxyquinazoline,
isobutyl 4-(4-amino-6,7,8-trimethoxyquinazolin-2-yl)
piperazine-1-carboxylate,
2-methylallyl 4-(4-amino-6,7,8-trimethoxyquinazolin-
2-yl)piperazine-1-carboxylate and
2-methyl-2-hydroxypropyl 4-(4-amino-6,7,8-trimethoxy-
quinazolin-2-yl)piperazine-1-carboxylate, and their hydrochloride acid addition salts. All these compounds exhibit hypotensive activity to a significantly high degree. In addition, they have a more favorable pharmacological profile (e.g., they are non-adrenolytic in dogs) and possess greatly improved solubility characteristics (particularly in water) as contrasted to the corresponding 6,7-dialkoxy compounds reported in the prior art.

DETAILED DESCRIPTION OF THE INVENTION

In accordance with the process employed for preparing the novel compounds of this invention, a 2-halo-4-amino-6,7,8-trialkoxyquinazoline of the following structure:

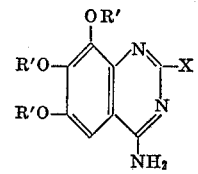

where R' is defined as aforesaid and X is a halogen atom selected from the group consisting of chlorine and bromine, is treated with an appropriate amine base of the formula ZH, where Z is as previously defined, to form the desired 2-substituted-4-amino-6,7,8-trialkoxyquinazoline final product. This particular reaction is normally carried out by using an excess of the amine base with respect to the required equimolar ratio, since this serves to shift the reaction equilibrium to the product side of the equation. In addition, the excess amine can also function as a solvent for the reaction, with a preferred excess for these purposes being from about two to about ten moles of amine per one mole of 2-halo-4-amino-6,7, 8-trialkoxyquinazoline. On the other hand, a reaction-inert polar organic solvent may also be used for the reaction and this would ordinarily entail employment of a cyclic ether such as dioxane and tetrahydrofuran, or a lower dialkylsulfoxide such as dimethyl and diethylsulfoxide, or a lower alkanol solvent like methanol, ethanol or isoamyl alcohol, etc. or even a N,N-dialkyl lower alkanoamide such as N,N-dimethylformamide, N,N-dimethylacetamide, N,N-diethylformamide and the like. The temperature at which the reaction can be conducted varies widely within the range of from about 50° C. up to about 200° C. for a period of about one to about twelve hours.

A preferred reaction time and temperature for the process at hand would be about 120–150° C. for about 2–4 hours. In the case where a particular solvent is used and/ or the boiling point of the amine is below the desired reaction temperature range, it is often customary in practice to employ a sealed pressure bottle as the proper vessel in which to conduct the reaction. Upon completion of same, recovery of the desired product is readily effected by any number of conventional means. For instance, the solvent is evaporated from the mixture and the crude concentrate or resulting solid residue is thereafter triturated with ethyl acetate or similar organic solvent. In this way, high yields of trialkoxy-quinazoline final product are obtained. It should be noted in this connection that the amines (ZH) employed as reagent in this reaction are, for the most part known compounds or else they can easily be prepared by those skilled in the art from readily available starting materials, using the standard procedures of organic chemistry.

The 2 - halo-4-amino-6,7,8-trialkoxyquinazoline base compounds used as starting materials in the herein described process of this invention, such as 2-chloro and 2-bromo-4-amino-6,7,8-trimethoxyquinazoline, are themselves new compounds which are prepared by treating the corresponding 2,4 - dihalo-6,7,8-trialkoxyquinazolines of the formula:

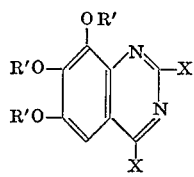

where R' and X have the same meaning as before, with at least an equimolar amount of ammonia and preferably, from about one to about ten moles of same, in a reaction-inert organic solvent of the same type employed in the previously described final step. The temperature for this particular reaction will vary from about 15° C. to about 75° C. for a period of about one to about 24 hours. Upon completion of the reaction, recovery of the desired intermediate is readily accomplished using conventional means, such as, for example, partial evaporation of the solvent from the reaction mixture until incipient crystallization takes place, followed by trituration of the resulting residue with water or by reprecipitation of said residue from dilute aqueous acid. The 2,4-dihalo-6,7,8-trialkoxyquinazolines, on the other hand, are all new compounds obtained by essentially known methods, starting from the corresponding known 2-amino-3,4,5-trialkoxybenzoic acid and reacting the latter type compound with either sodium or potassium cyanate in an aqueous acidic medium, followed by cyclization with aqueous base to form the intermediate 6,7,8-trialkoxy - 2,4[1H,3H] - quinazolindione ring compound, which, in turn, then yields the corresponding novel 2,4-dihalo-6,7,8-trialkyloxyquinoline on treatment with either phosphorus oxychloride or phosphorus oxybromide in accordance with the general procedure of F. H. S. Curd et al., as described in the Journal of the Chemical Society (London), 1948, p. 1759.

As regards compounds of the invention where R of the N-substituted piperazine moiety is hydroxyalkoxy, as previously defined, a preferred and alternate method of preparation simply involves treating the corresponding compound where R is alkenyloxy, as obtained by the principal process of this invention, with water in the presence of at least a catalytic amount of concentrated sulfuric acid to form the desired secondary or tertiary alcohol, as the case may be, in accordance with the standard methods of organic chemistry. A preferred temperature range for this reaction would normally be from about 0–20° C. In ths way, a compound such as 2-methylallyl 4-(4-amino-6,7,8-trimethoxyquinazolin-2-yl)piperazine - 1 - carboxylate is converted to 2-methyl-2-hydroxypropyl 4-(4-amino-6,7,8-trimethoxyquinazolin-2-yl)piperazine-1-carboxylate in a most facile manner, as is hereinafter described in more detail in the examples which follow.

Inasmuch as the 2 - substituted-4-amino-6,7,8-trialkoxyquinazoline compounds of this invention are basic compounds, they are capable of forming a wide variety of different salts with various inorganic and organic acids. Although such salts must first be pharmaceutically acceptable for administration to animals, it is often desirable in pratcice to initially isolate the 2-substituted-4-amino-6,7, 8-trialkoxyquinazoline base compound from the reaction mixture as a pharmaceutically unacceptable salt and then simply convert the latter back to the free base compound by treatment with an alkaline reagent and thereafter, subsequently convert the latter free base to a pharmaceutically acceptable acid addition salt. The acid addition salts of the 2 - substituted-4-amino-6,7,8-trialkoxyquinazoline base compounds of this invention are readily prepared by treating the base compound with an equivalent amount of the chosen acid in an aqueous solution or in a suitable organic solvent, such as methanol or ethanol. Upon evaporation of the solvent, the desired solid salt is obtained.

The acids which are used to prepare the pharmaceutically acceptable acid addition salts of the aforementioned 2-substituted-4-amino - 6,7,8 - trialkoxyquinazoline base compounds of this invention are those which form non-toxic acid addition salts, i.e., salts containing pharmacologically acceptable anions, such as the hydrochloride, hydrobromide, hydroiodide, nitrate, sulfate or bisulfate, phosphate or acid phosphate, acetate, lactate, citrate or acid citrate, tartrate or bitartrate, succinate, maleate, fumarate, gluconate, saccharate, methanesulfonate, ethanesulfonate, benzenesulfonate, p-toluene-sulfontae and pamoate [i.e., 1,1'-methylenebis(2-hydroxy-3-naphthoate)] salts.

As previously indicated, the 2-substituted-4-amino-6,7,8-trialkoxyquinazoline compounds of the present invention are all readily adapted to therapeutic use as antihypertensive agents, particularly in view of their ability to lower the blood pressure of hypertensive subjects to a statistically significant degree. For instance, 2-methyl-2-hydroxypropyl 4-(4-amino-6,7,8-trimethoxyquinazolin-2-yl)piperazine-1-carboxylate, a typical and preferred agent of the present invention, has been found to lower the blood pressure of conscious hypertensive dogs to a statistically significant degree (e.g., up to 42 mm. Hg after two hours subsequent to drug administration) when given by the oral route of administration at increasing dose levels ranging from 2.5–40 mg./kg., daily, for a period of up to four days. Additionally, these compounds are well absorbed in the body and none of them cause any substantial side effects to occur in the subject to whom they are administered, i.e., no problems of toxicity or of an untoward pharmacological nature, like postural hypotension, are ever encountered when said compounds are administered for the aforestated purpose in the manner described as indicated above.

In accordance with a method of treatment of the present invention, the herein described 2-substituted-4-amino-6,7,8-trialkoxyquinazoline antihypertensive agents can be administered to a hypertensive subject via either the oral or parenteral routes of administration. In general, these compounds are most desirably administered in doses ranging from about 10 mg. up to about 600 mg. per day, although variations will still necessarily occur depending upon the weight of the subject being treated. However, a dosage level that is in the range of from about 0.16 mg. to about 9.6 mg. per kg. of body weight per day is most desirably employed in order to achieve effective results, with a preferred oral range in man being about 2.5–5.0 mg./kg. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the use of the 2-substituted-4-amino-6,7,8-trialkoxyquinazoline compounds of this invention for the treatment of hypertensive subjects, it is to be noted that they may be administered either alone or in combination with pharmaceutically acceptable carriers by either of the routes previously indicated, and that such administration can be carried out in both single and multiple dosages. More particularly, the novel compounds of the invention can be administered in a wide-variety of different dosage forms, i.e., they may be combined with various pharmaceutically-acceptable inert carriers in the form of tablets, capsule, lozenges, troches, hard candies, powders, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in the connection would also include lactose or milk sugar, as well as high molecular weight polyethylene glycols. When aqueous suspensions and/or elixirs are desired for oral administration, the essential active ingredient therein may be combined with various sweetening or flavoring agents, coloring matters or dyes, and, if so desired, emulsifying and/or suspending agents as well, together with such diluents as water, ethanol, propylene glycol, glycerin and various like combinations thereof.

For purposes of parenteral administration, solutions of these particular 2 - substituted - 4-amino-6,7,8-trialkoxyquinazolines in either sesame or peanut oil or in aqueous propylene glycol may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular solutions are especially suitable for intravenous, intramuscular and subcutaneous injection purposes.

PREPARATION A

A solution consisting of 65.3 g. (0.805 mole) of potassium cyanate dissolved in 200 ml. of water was added with stirring, during the course of a 15-minute period, to a suspension of 112 g. (0.535 mole) of 2-amino-3,4,5-trimethoxybenzoic acid [obtained by saponification, with 1 N NaOH in methanol-water (4:1 by volume), of the corresponding known methyl ester] in 2.6 liters of water containing 46 ml. of glacial acetic acid, while maintaining the temperature of the mixture at ca. 30° C. throughout the course of the addition. The resulting reaction mixture was then stirred at this same temperature for two hours, followed by the subsequent addition of 746 mg. (18.3 moles) of sodium hydroxide (pellets) thereto with the aid of gentle external cooling to maintain the temperature below (or near) 40° C. The resulting suspension was thereafter stirred for one hour at room temperature (~25° C. and finally, acidified with concentrated hydrochloric acid, with external cooling being required to keep the temperature below 25° C.

The final mixture was stirred at this point for one hour and filtered, and the solid residue thus obtained (i.e., the filter cake) was subsequently washed with water and air-dried before being ground to a fine powder. After drying the latter material to constant weight in vacuo over $P_2O_5$, there was obtained a 135 g. (87%) yield of 6,7,8-trimethoxy - 2,4[1H,3H]quinazolindione in the form of a yellow crystalline powder, M.P. 259–262° C. Recrystallization of the product from dimethylformamide-water then gave fine white plates, M.P. 266–269° C.

Analysis.—Calcd. for $C_{11}H_{12}N_2O_5$ (percent): C, 52.38; H, 4.80; N, 11.11. Found (percent): C, 51.86; H, 4.78; N, 11.30.

PREPARATION B

The procedure described in Preparation A is repeated except that 2-amino-3,4,5-triethoxybenzoic acid is the starting material employed in place of the corresponding trimethoxy acid. In this particular case, the corresponding final product obtained is 6,7,8-triethoxy-2,4[1H,3H]-quinazolindione.

EXAMPLE I

A mixture consisting of 70.0 g. (0.278 mole) of 6,7,8-trimethoxy-2,4[1H,3H]-quinazolindione (M.P. 259–262° C.) and 1100 ml. of phosphorus oxychloride was heated to reflux with stirring for a period of two hours. At the end of this time, the resulting clear solution was concentrated under reduced pressure and the residue thus obtained was dissolved in ca. 750 ml. of chloroform. The chloroform solution was slowly poured, with stirring, into an excess of saturated aqueous sodium bicarbonate and the resulting mixture vigorously stirred until evolution of carbon dioxide gas virtually ceased. The chloroform layer was then separated from the mixture and combined with two subsequent chloroform extracts (750 ml.) of the aqueous phase. The combined chloroform extracts were then washed with water, dried over anhydrous sodium sulfate and filtered to give a dry organic filtrate that was subsequently concentrated under reduced pressure to yield 73.0 g. (91%) of 2,4-dichloro-6,7,8-trimethoxyquinazoline (M.P. 148–151° C.) as a tan crystalline residue. Recrystallization of the latter material from ethanol then gave fine white needles, M.P. 147–150° C.

Analysis.—Calcd. for $C_{11}H_{10}Cl_2N_2O_3$ (percent): C, 45.99; H, 3.48; N, 9.68; Cl, 24.52. Found (percent): C, 45.48; H, 3.14; N, 9.76; Cl, 24.60.

EXAMPLE II

The procedure described in Example I is repeated except that 6,7,8-triethoxy-2,3[1H,3H]-quinazolindione is the starting material employed and 2,4-dichloro-6,7,8-triethoxyquinazoline is the corresponding final product thus obtained.

EXAMPLE III

The procedure described in Example I is repeated except that phosphorus oxybromide is the actual reagent employed in lieu of phosphorus oxychloride and 2,4-dibromo-6,7,8-trimethoxyquinazoline is the corresponding final product thus obtained.

In like manner, 6,7,8-triethoxy-2,4[1H,3H]-quinazolindione and phosphorus oxybromide react in accordance with this procedure to afford 2,4-dibromo-6,7,8-triethoxyquinazoline.

EXAMPLE IV

A vigorously stirred solution of 2,4-dichloro-6,7,8-trimethoxyquinazoline (73.0 g., M.P. 148–151° C.) in tetrahydrofuran was treated with anhydrous ammonia by passing said gas through the solution for a period of two hours. The resulting reaction mixture was then stirred at room temperature (~25° C.) for a period of 16 hours and finally, concentrated under reduced pressure to afford a solid residue. The latter material was subsequently triturated with ca. 500 ml. of water and the resulting aqueous suspension thereafter filtered. The residual filter cake was then washed with water and partially air-dried, before being suspended in hot ethanol. The latter alcoholic suspension was then cooled and filtered to give, after drying to constant weight, 56.2 g. (75%) of 2-chloro-4-amino-6,7,8-trimethoxyquinazoline in the form of pure white crystals, M.P. 243–246° C. Recrystallization of the latter material from ethanol then raised the melting point to 244–246° C.

*Analysis.*—Calcd. $C_{11}H_{12}ClN_3O_3$ (percent): C, 48.99; H, 4.49; N, 15.58; Cl, 13.15. Found (percent): C, 48.95; H, 4.53; N, 15.65; Cl, 13.09.

EXAMPLE V

The procedure described in Example IV is repeated except that 2,4-dichloro-6,7,8-triethoxyquinazoline is the starting material employed and 2-chloro-4-amino-6,7,8-triethoxyquinazoline is the corresponding final product thus obtained.

EXAMPLE VI

The procedure described in Example IV is repeated that 2,4-dibromo-6,7,8-trimethoxyquinazoline is the starting material employed and 2-bromo-4-amino - 6,7,8 - trimethoxyquinazoline is the starting material employed and 2-bromo-4-amino-6,7,8-trimethoxyquinazoline is the corresponding final product thus obtained.

In like manner, 2,4-dibromo-6,7,8-triethoxyquinazoline and anhydrous ammonia react in accordance with this procedure to afford 2-bromo-4-amino-6,7,8-triethoxyquinazoline.

EXAMPLE VII

A mixture consisting of 8.08 g. (0.030 mole) of 2-chloro-4-amino-6,7,8-trimethoxyquinazoline (M.P. 243–246° C.) and 5.88 g. (0.033 mole) of 2 - methyl - allyl 1-piperazinecarboxylate in 200 ml. of isoamyl alcohol was heated to reflux for a period of 75 minutes. The resulting mixture was then cooled and concentrated under reduced pressure to afford an amorphous residue, which was subsequently triturated with ethyl acetate. The residue thus obtained was recovered by means of filtration and washed with ethyl acetate to give, after air drying to constant weight, 12.6 g. (93%) or 2-methylallyl 4-(4-amino-6,7,8-trimethoxyquinazolin - 2 - yl)piperazine-1-carboxylate as the pure hydrochloride salt, in the form of white crystals melting at 186–188° C. (dec.). Recrystallization of the product from ethanolic hydrochloric acid did not raise the melting point.

*Analysis.*—Calcd. $C_{20}H_{27}N_5O_5 \cdot HCl$ (percent): C, 52.92; H, 6.22; N, 15.43; Cl, 7.81. Found (percent): C, 52.83; H, 6.47; N, 15.45; Cl, 7.82.

Subsequent conversion of the above hydrochloride salt to the corresponding free organic base was then accomplished by dissolving 7.6 g. of said product in water-ethanol (9:1 by volume), followed by treatment with an excess of saturated aqueous sodium bicarbonate. The essentially pure free base compound was then separated from the resulting mixture by means of filtration, and washed with water and air-dried to give 6.8 g. (97%) of 2 - methylallyl 4-(4-amino-6,7,8-trimethoxyquinazolin-2-yl)-piperazine-1-carboxylate in the form of pure white crystals, M.P. 170–173° C. Recrystallization of the latter material from chloroform-diisopropyl ether then raised the melting point to 172–174° C.

*Analysis.*—Calcd. for $C_{20}H_{27}N_5O_5$ (percent): C, 57.54; H, 6.52; N, 16.78. Found (percent): C, 57.06; H, 6.44; N, 16.43.

EXAMPLE VIII

A stirred solution consisting of 24 ml. of concentrated sulfuric acid dissolved in an equal volume of water was cooled to ca. 12° C. and treated with 6.25 g. (0.015 mole) of 2-methylallyl 4-(4-amino-6,7,8-trimethoxyquinazolin-2-yl)piperazine-1-carboxylate added in small portions, with stirring being maintained throughout the course of the addition at such a rate as to always keep the temperature of the reaction mixture below 20° C. The resulting mixture was then further stirred for 15 minutes, while at 18° C., to give a clear solution, which was subsequently stirred for an additional two hours at 10–15° C. The aqueous solution thus obtained was then diluted with 150 ml. of ice-water and adjusted to a pH of ca. 10 with 50% aqueous sodium hydroxide, while maintaining the temperature below 12° C. throughout this step. The resulting alkaline mixture was next extracted with four 150-ml. portions of chloroform, and the chloroform extracts were combined, washed with water and then dried over anhydrous sodium sulfate. After removal of the drying agent by means of filtration and the organic solvent by means of evaporation under reduced pressure, there was ultimately obtained a white crystalline solid as residue. The yield of product amounted to 6.0 g. and it melted at 151–115° C. Recrystallization of this material from chloroform-diisopropyl ether then gave 5.0 g. (77%) of pure 2-methyl-2-hydroxypropyl 4-(4-amino-6,7,8 - trimethoxyquinazolin - 2 - yl)piperazine-1-carboxylate, as white crystals melting at 156–159° C. A further recrystallization from the same solvent system then raised the melting point to 158–159° C.

*Analysis.*—Calcd. for $C_{20}H_{29}N_5O_6$ (percent): C, 55.16; H, 6.71; N, 16.08. Found (percent): C, 55.09; H, 6.62; N, 15.84.

Treatment of the above free organic base (4.5 g.) in ethanol with ethanolic hydrochloric acid in the cold (cooling being effected by means of an ice-water bath) then gave 3.24 g. (66%) of 2-methyl-2-hydroxypropyl 4-(4-amino-6,7,8-trimethoxyquinazolin - 2 - yl)piperazine-1-carboxylate hydrochloride, as white crystals melting at 166–169° C. (dec.).

*Analysis.*—Calcd. for $C_{20}H_{29}N_5O_6 \cdot HCl \cdot H_2O$ (percent): C, 49.03; H, 6.58; N, 14.29; Cl, 7.24. Found (percent): C, 48.88; H, 6.63; N, 14.32; Cl, 7.36.

EXAMPLE IX

The procedure described in Example VII was repeated to prepare the following 2-substituted-4-amino-6,7,8-trimethoxyquinazolines, reported as hydrochlorides, starting from 2-chloro-4-amino-6,7,8-trimethoxyquinazoline and the appropriate primary or secondary organic amine reagent in each case:

2-(N-monomethylamino)-4-amino-6,7,8-trimethoxyquinazoline hydrochloride, M.P. 229–231° C.

2-(N,N-dimethylamino)-4-amino-6,7,8-trimethoxyquinazoline hydrochloride, M.P. 237–239° C.

2-(N,N-diethylamino)-4-amino-6,7,8-trimethoxyquinazoline hydrochloride, M.P. 186–188° C.

2-[N,N-di-(n-propyl)amino]-4-amino-6,7,8-trimethoxyquinazoline hydrochloride, M.P. 201–203° C.

2-[N,N-di(β-hydroxyethyl)amino]-4-amino-6,7,8-trimethoxyquinazoline hydrochloride, M.P. 220–222° C.

2-(N-pyrrolidino)-4-amino-6,7,8-trimethoxyquinazoline hydrochloride, M.P. 218–220° C.

2-(N-piperidino)-4-amino-6,7,8-trimethoxyquinazoline hydrochloride, M.P. 219–221° C.

2-(N-homopiperidino)-4-amino-6,7,8-trimethoxyquinazoline hydrochloride, M.P. 186–189° C.

2-(4-benzoyl-1-piperazinyl)-4-amino-6,7,8-trimethoxyquinazoline hydrochloride, M.P. 175–177° C.

2-[4-(2-furoyl)-1-piperazinyl]-4-amino-6,7,8-trimethoxyquinazoline hydrochloride, M.P. 208–209° C.

ethyl 4-(4-amino-6,7,8-trimethoxyquinazolin-2-yl)-piperazine-1-carboxylate hydrochloride, M.P. 228–230° C.

isobutyl 4-(4-amino-6,7,8-trimethoxyquinazolin-2-yl)-piperazine-1-carboxylate hydrochloride, M.P. 190–192° C.

Subsequent conversion of each of the above hydrochloride salts to the corresponding free organic base compound, in each case via saturated aqueous sodium bicarbonate solution in the manner of Example VII, then affords the corresponding 2 - substituted-4-amino-6,7,8-trimethoxyquinazoline in pure form as such.

EXAMPLE X

The procedure described in Example VII is employed again to prepare the following 2-substituted-4-amino-6,7,8-trialkoxyquinazolines, starting from the corresponding 2 - chloro-4-amino-6,7,8-trialkoxyquinazoline compound and the appropriate amine reagent in each instance:

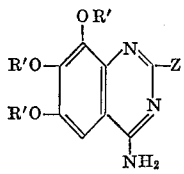

| 6-OR' | 7-OR' | 8-OR' | Z |
|---|---|---|---|
| OCH₃ | OCH₃ | OCH₃ | NH(n-C₃H₇) |
| OC₂H₅ | OC₂H₅ | OC₂H₅ | NHCH₃ |
| OC₂H₅ | OC₂H₅ | OC₂H₅ | NHC₂H₅ |
| OCH₃ | OCH₃ | OCH₃ | NHC₂H₅ |
| OCH₃ | OCH₃ | OCH₃ | NH(iso-C₃H₇) |
| OC₂H₅ | OC₂H₅ | OC₂H₅ | NH(n-C₃H₇) |
| OCH₃ | OCH₃ | OCH₃ | N(iso-C₃H₇)₂ |
| OC₂H₅ | OC₂H₅ | OC₂H₅ | N(CH₃)₂ |
| OC₂H₅ | OC₂H₅ | OC₂H₅ | N(n-C₃H₇)₂ |
| OCH₃ | OCH₃ | OCH₃ | NH(CH₂CH₂OH) |
| OC₂H₅ | OC₂H₅ | OC₂H₅ | N(CH₂CH₂OH)₂ |
| OC₂H₅ | OC₂H₅ | OC₂H₅ | NH(CH₂CH₂OH) |
| OC₂H₅ | OC₂H₅ | OC₂H₅ | Pyrrolidino. |
| OC₂H₅ | OC₂H₅ | OC₂H₅ | Piperidino. |
| OC₂H₅ | OC₂H₅ | OC₂H₅ | Homopiperidino. |

EXAMPLE XI

The procedure described in the previous examples is employed once aagin to prepare the following 2-substituted-4-amino-6,7,8-trialkoxyquinazolines, starting from the corresponding 2-chloro-4-amino-6,7,8-trialkoxyquinazoline compound and the appropriate 1-piperazinecarboxylate reagent in each instance:

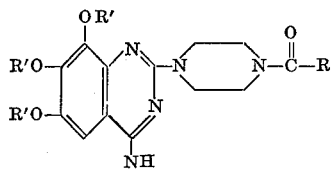

| 6-OR' | 7-OR' | 8-OR' | R |
|---|---|---|---|
| OCH₃ | OCH₃ | OCH₃ | Methyl. |
| OC₂H₅ | OC₂H₅ | OC₂H₅ | Do. |
| OCH₃ | OCH₃ | OCH₃ | n-Hexyl. |
| OC₂H₅ | OC₂H₅ | OC₂H₅ | Do. |
| OCH₃ | OCH₃ | OCH₃ | n-Propyl. |
| OC₂H₅ | OC₂H₅ | OC₂H₅ | Isopropyl. |
| OC₂H₅ | OC₂H₅ | OC₂H₅ | Phenyl. |
| OCH₃ | OCH₃ | OCH₃ | α-Napthhyl. |
| OCH₃ | OCH₃ | OCH₃ | β-Naphthyl. |
| OC₂H₅ | OC₂H₅ | OC₂H₅ | α-Naphthyl. |
| OC₂H₅ | OC₂H₅ | OC₂H₅ | β-Naphthyl. |
| OCH₃ | OCH₃ | OCH₃ | 3-furyl. |
| OC₂H₅ | OC₂H₅ | OC₂H₅ | 2-furyl. |
| OC₂H₅ | OC₂H₅ | OC₂H₅ | 3-furyl. |
| OCH₃ | OCH₃ | OCH₃ | 2-thienyl. |
| OC₂H₅ | OC₂H₅ | OC₂H₅ | 3-thienyl. |
| OC₂H₅ | OC₂H₅ | OC₂H₅ | 2-thienyl. |
| OCH₃ | OCH₃ | OCH₃ | 3-thienyl. |
| OCH₃ | OCH₃ | OCH₃ | Methoxy. |
| OC₂H₅ | OC₂H₅ | OC₂H₅ | Do. |
| OCH₃ | OCH₃ | OCH₃ | OC₆H₁₃(n) |
| OC₂H₅ | OC₂H₅ | OC₂H₅ | OC₆H₁₃(n) |
| OC₂H₅ | OC₂H₅ | OC₂H₅ | OC₄H₉(iso) |
| OCH₃ | OCH₃ | OCH₃ | OC₄H₉(n) |
| OC₂H₅ | OC₂H₅ | OC₂H₅ | OC₂H₅(iso) |
| OCH₃ | OCH₃ | OCH₃ | OCH=CH₂ |
| OC₂H₅ | OC₂H₅ | OC₂H₅ | OCH=CH₂ |
| OCH₃ | OCH₃ | OCH₃ | OCH₂CH=CH₂ |
| OC₂H₅ | OC₂H₅ | OC₂H₅ | OCH₂CH=CH₂ |
| OC₂H₅ | OC₂H₅ | OC₂H₅ | OCH₂C(CH₃)=CH₂ |
| OCH₃ | OCH₃ | OCH₃ | OCH₂C(CH₃)=CHCH₃ |
| OC₂H₅ | OC₂H₅ | OC₂H₅ | OCH₂C(CH₃)=CHCH₃ |
| OCH₃ | OCH₃ | OCH₃ | OCH₂CH₂OH |
| OC₂H₅ | OC₂H₅ | OC₂H₅ | OCH₂CH₂OH |
| OCH₃ | OCH₃ | OCH₃ | OCH₂CH(OH)CH₃ |
| OC₂H₅ | OC₂H₅ | OC₂H₅ | OCH₂CH(OH)CH₃ |
| OCH₃ | OCH₃ | OCH₃ | OCH₂CH(OH)CH₂CH₃ |
| OC₂H₅ | OC₂H₅ | OC₂H₅ | OCH₂C(CH₃)₂CH₂OH |
| OCH₃ | OCH₃ | OCH₃ | OCH(CH₃)CH(CH₃)CH₂OH |
| OC₂H₅ | OC₂H₅ | OC₂H₅ | OCH₂C(CH₃)₂CH₂OH |
| OCH₃ | OCH₃ | OCH₃ | OC(CH₃)₂C(OH)(CH₃)₂ |
| OC₂H₅ | OC₂H₅ | OC₂H₅ | OC(CH₃)₂C(OH)(CH₃)₂ |

EXAMPLE XII

The procedure described in Example VII is employed once again to prepare the final products of Examples VII and IX–XI by merely using the appropriate 2-bromo-4-amino - 6,7,8-trialkoxyquinazoline compound, in place of the corresponding 2-chloro compound, as proper starting material for the reaction. In each and every case, the final product thus obtained (i.e., the 2-substituted-4-amino-6,7,8-trialkoxyquinazoline compound) is found to be identical with that reported previously for the corresponding reaction in the aforesaid examples. For instance, 2-bromo-4 - amino - 6,7,8-trimethoxyquinazoline and 2-methallyl 1-piperazinecarboxylate react in this manner to afford 2-methallyl 4 - (4 - amino-6,7,8-trimethoxyquinazolin-2-yl) piperazine-1-carboxylate, identical in every respect with the product of Example VII.

EXAMPLE XIII

The other hydrohalide acid addition salts of the 2-substituted-4 - amino - 6,7,8 - trialkoxyquinazoline base compounds of this invention reported previously, such as the corresponding hydrochloride, hydrobromide and hydriodide salts, are each individually prepared by first dissolving the respective organic base compound in absolute ether and then adding a saturated solution of the appropriate hydrohalide gas in ethyl acetate to the aforementioned ethereal solution, whereupon the desired acid addition salt soon precipitates from said solution. In this way, 2-methyl - 2 - hydroxypropyl 4 - (4-amino-6,7,8-trimethoxyquinazolin-2-yl) piperazine-1-carboxylate (1.0 g.) is converted via dry hydrogen bromide gas to the corresponding hydrobromide acid addition salt in almost quantitative yield.

EXAMPLE XIV

The nitrate, sulfate or bisulfate, phosphate or acid phosphate, acetate, lactate, citrate or acid citrate, tartrate or bitartrate, succinate, maleate, fumarate, methanesulfonate, ethanesulfonate, benzenesulfonate, p-toluenesulfonate and pamoate [i.e., 1,1' - methylene - bis(2-hydroxy-3-naphthoate)] salts of each of the aforementioned 2-substituted-4-amino - 6,7,8 - trialkoxyquinazoline base compounds reported previously are each prepared by dissolving the proper molar amounts of the respective acid and base in separate portions of ethanol and then mixing the two solutions together, followed by the addition of diethyl ether to the resultant solution in order to effect precipitation of the desired acid addition salt thereform. In this manner, equimolar amounts of 2-(N,N-dimethylamino)-4-amino-6,7,8-trimethoxyquinazoline and concentrated sulfuric acid react to afford the corresponding sulfuric acid addition salt. In like manner, each of the other salts is also similarly prepared.

EXAMPLE XV

A dry solid pharmaceutical composition is prepared by blending the following materials together in the proportions by weight specified below:

| | |
|---|---|
| 2-methyl-2-hydroxypropyl 4 - (4 - amino-6,7,8-trimethoxyquinazolin-2 - yl)piperazine-1-carboxylate hydrochloride | 50 |
| Sodium citrate | 25 |
| Alginic acid | 10 |
| Polyvinylpyrrolidone | 10 |
| Magnesium stearate | 5 |

After the dried mixture is thoroughly blended, tablets are punched from the resulting mixture, each tablet being of such size that it contains 50 mg. of the active ingredient. Other tablets are also prepared in a similar fashion containing 5, 10 and 25 mg. of the active ingredient, respectively, by merely using the appropriate amount of the trialkoxy-quinazoline compound in each case.

EXAMPLE XVI

A dry solid pharmaceutical composition is prepared by combining the following materials together in the proportions by weight indicated below:

2 - [4 - (2-furoyl)-1-piperazinyl]-4-amino-6,7,8-trimethoxyquinazoline hydrochloride _____ 50
Polyethylene glycol, average molecular weight 4000 __ 30

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient quantity of material in each instance so as to provide each capsule with 100 mg. of the active ingredient.

EXAMPLE XVII

The following 2-substituted-4-amino-6,7,8-trimethoxyquinazolines were tested for hypotensive activity in conscious hypertensive dogs by the procedure of Prioli and Winbury, as described in the Journal of Applied Physiology, vol. 15, p. 323 (1960) and found to be effective at the indicated concentration levels by both the oral and intravenous routes. The compound were administered in the form of their hydrochloride salts and the blood pressure determinations were made just prior to and at frequent intervals after drug administration (e.g., at two, four and 24 hours thereafter), using at least two or more dogs for the evaluation of each compound. The activity is therefore expressed in terms of the observed range in reduction of blood pressure (in mm. Hg) in two or more dogs, while the concentration levels are reported as mg./kg. per dose.

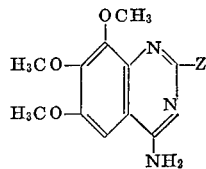

| | Activity, ΔP mm. Hg (mg./kg./dose) | |
|---|---|---|
| | I.V. | P.O. |
| NHCH₃ | | 25–42 (10), 25–30 (20) |
| N(CH₃)₂ | 12–20 (1), 30–60 (4) | 7–45 (10), 12–32 (20) |
| N(C₂H₅)₂ | 0–15 (1), 10–20 (4) | 20 (5), 0–25 (10) |
| N(n-C₃H₇)₂ | 0–15 (4), 0–70 (8) | |
| N(CH₂CH₂OH)₂ | | 0–30 (10) |
| N-pyrrolidino | 10–15 (1), 10–22 (4) | |
| N-piperidino | 10–30 (1), 15–40 (2) | 0–8 (10), 0–20 (20) |
| N-homopiperidino | 0–20 (2), 10–50 (4) | 0–15 (10), 0–15 (20) |

EXAMPLE XVIII

The test procedure described in the previous example was repeated here to determine the hypotensive activity of the following 2-substituted-4-amino-6,7,8-trimethoxyquinazoline compounds, and the results obtained in this manner are reported below in the usual tabular form:

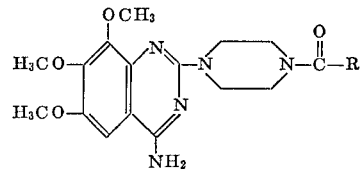

| | ΔP mm. Hg (mg./kg./dose) | |
|---|---|---|
| R | I.V. | P.O. |
| Phenyl | 0–10 (4), 0–15 (8) | |
| 2-furyl | 15–25 (3.2), 20–40 (6.4) | 8–35 (10), 35–42 (20) |
| OC₄H₉(iso) | 15–24 (4), 18–40 (10) | 35–40 (10), 18–35 (20) |
| OCH₂C(CH₃)=CH₂ | 20 (4), 15–25 (8) | 15–20 (10), 15–20 (20) |
| OCH₂C(OH)(CH₃)₂ | 10–26 (1), 6–24 (4) | 15–30 (2.5), 30–42 (10) |

What is claimed is:
1. A compound selected from the group consisting of 2-halo-4-substituted-6,7,8-trialkoxyquinazolines of the formulae:

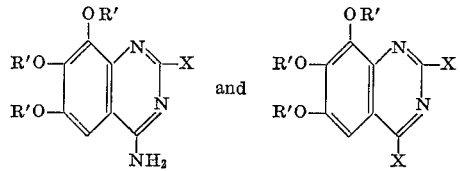

wherein R' is chosen from the group consisting of methyl and ethyl, and X is a halogen atom selected from the group consisting of chlorine and bromine.
2. A compound as claimed in claim 1 wherein X is chlorine.
3. A compound as claimed in claim 1 wherein X is bromine.
4. 2-chloro-4-amino-6,7,8-trimethoxyquinazoline.
5. 2,4-dichloro-6,7,8-trimethoxyquinazoline.

References Cited
UNITED STATES PATENTS
3,637,700    1/1972    Gabel et al. _____ 260—256.5 R ALEX MAZEL, Primary Examiner R. V. RUSH, Assistant Examiner U.S. Cl. X.R.
260—256.4 Q